United States Patent
Steenhoek et al.

(10) Patent No.: US 7,639,255 B2
(45) Date of Patent: Dec. 29, 2009

(54) REALISTIC VIDEO COLOR DISPLAY

(75) Inventors: Larry Eugene Steenhoek, Wilmington, DE (US); Allan Blase Joseph Rodrigues, Bloomfield Hills, MI (US); Daniel A. Benton, Wilmington, DE (US); Gerard T. Brosmer, Wilmington, DE (US); Robert Vincent Canning, Jr., Bear, DE (US); Aaron J. Owens, Lewes, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 634 days.

(21) Appl. No.: 11/588,471

(22) Filed: Oct. 27, 2006

(65) Prior Publication Data

US 2007/0097119 A1 May 3, 2007

Related U.S. Application Data

(60) Provisional application No. 60/731,620, filed on Oct. 28, 2005.

(51) Int. Cl.
| | |
|---|---|
| G06T 17/00 | (2006.01) |
| G09G 5/00 | (2006.01) |
| G09G 5/02 | (2006.01) |
| G03F 3/08 | (2006.01) |
| H04N 1/46 | (2006.01) |
| G06K 9/40 | (2006.01) |
| G01J 3/46 | (2006.01) |
| B05D 7/00 | (2006.01) |

(52) U.S. Cl. ............... 345/428; 345/600; 345/591; 345/589; 345/606; 358/518; 358/525; 382/167; 382/254; 382/274; 382/300; 356/402; 356/405; 427/8; 427/469

(58) Field of Classification Search ......... 345/426–428, 345/581–583, 586–589, 593, 597, 643, 600–610, 345/618–619, 649, 549, 657–659; 358/515–525; 382/162, 167, 254, 274, 276, 300; 356/402–405; 702/1, 150–151, 179, 193; 427/8, 469, 500
See application file for complete search history.

(56) References Cited

U.S. PATENT DOCUMENTS 5,231,472 A 7/1993 Marcus et al.

(Continued)

FOREIGN PATENT DOCUMENTS

EP 1 207 386 5/2002

(Continued)

OTHER PUBLICATIONS

Haase et al., Modeling Pigmented Materials for Realistic Image Synthesis, ACM Transactions on Graphics, vol. 11, No. 4, Oct. 1992, pp. 305-335.

(Continued)

Primary Examiner—Wesner Sajous
(74) Attorney, Agent, or Firm—Gann G. Xu

(57) ABSTRACT

A computer-implemented method for displaying on a color display device a realistic color of a paint coating comprising the following steps: (A) identify L*, a* b* color values at least three different angles for a paint coating from a data base; (B) convert the at least three angle L*, a* b* color values to tristimulus X, Y, Z values; (C) develop continuous function equation for each tristimulus X, Y, Z values vs. aspecular angle via computer implementation and calculate the range of angles to be displayed; (D) calculate a range of aspecular angles required to display the object; (E) calculate R,G,B values from tristimulus values over the range of aspecular angles and determine maximum saturation of R,G,B values and bring into range allowed by color display device; (F) determine statistical texture function of paint coating to be simulated; and (G) apply statistical texture function to the R,G,B values of step (E) and display color pixels on color display device to show realistic color of paint coating.

20 Claims, 2 Drawing Sheets

U.S. PATENT DOCUMENTS

| | | |
|---|---|---|
| 6,014,221 A | 1/2000 | Plude, Jr. |
| 6,618,050 B1 | 9/2003 | Rupieper et al. |
| 6,717,584 B2 | 4/2004 | Kulczycka |
| 6,788,413 B2 | 9/2004 | Torfs et al. |
| 6,914,613 B2 | 7/2005 | Marchand et al. |
| 6,924,817 B2 | 8/2005 | Rice et al. |
| 6,977,650 B2 | 12/2005 | Voye et al. |
| 7,020,580 B2 | 3/2006 | Peters et al. |
| 2002/0161530 A1 | 10/2002 | Corrigan et al. |
| 2002/0163640 A1* | 11/2002 | Masuda ............... 356/402 |
| 2003/0085904 A1* | 5/2003 | Kulczycka ............ 345/581 |
| 2004/0093112 A1 | 5/2004 | Marchand et al. |
| 2004/0181981 A1* | 9/2004 | DaRif et al. ......... 40/124.01 |
| 2004/0190367 A1* | 9/2004 | Wierzbicki et al. ...... 366/140 |
| 2005/0128484 A1* | 6/2005 | Rodrigues et al. ...... 356/402 |
| 2005/0160077 A1* | 7/2005 | Howes ................ 707/2 |
| 2005/0275842 A1 | 12/2005 | Simons et al. |
| 2006/0181707 A1* | 8/2006 | Gibson et al. ......... 356/402 |
| 2007/0003691 A1* | 1/2007 | Rodrigues et al. ...... 427/140 |
| 2007/0250273 A1* | 10/2007 | De Haas et al. ........ 702/22 |
| 2008/0235244 A1* | 9/2008 | Matsuo ............... 707/10 |

FOREIGN PATENT DOCUMENTS

| | | |
|---|---|---|
| EP | 1 207 386 A1 | 5/2002 |
| EP | 1 236 969 A2 | 9/2002 |
| JP | 2003 279413 | 10/2003 |
| JP | 2003-279413 | 10/2003 |
| JP | 2004 053260 | 2/2004 |
| JP | 2004-053260 | 2/2004 |
| JP | 2004 271467 | 9/2004 |
| JP | 2004-271467 | 9/2004 |
| JP | 2005 045128 | 2/2005 |
| JP | 2005-045128 | 2/2005 |
| WO | WO 2004/018984 | 3/2004 |
| WO | WO 2004/018984 A1 | 3/2004 |
| WO | WO 2004/044850 | 5/2004 |
| WO | WO 2004/044850 A1 | 5/2004 |
| WO | WO 2006/121776 A1 | 11/2006 |

OTHER PUBLICATIONS

Westkund et al., Applying Appearance Standards to Light Reflection Models in the International Conference on Computer Graphics, 28th Conference, 2001, ISBN:1-58113-374-X.

Meyer et al., Computer Aided Design of Automotive Finishes, in the Proceedings of 10th Congress of the International Colour Association, Granada, Spain, 2005.

Meyer et al., A Computer Graphic System for Rendering Gonio-Apparent Colors, International Society for Optical Eng., Jun. 2002.

Dumont-Becle et al., "Multi-texturing approach for paint appearance simulation on virtual vehicles", Sophia Antipolis, Sep. 2001.

PCT International Search Report and Written Opinion for International Application No. PCT/US2006/042076 dated Mar. 27, 2007.

Haase et al., Modeling Pigmented Materials for Realistic Image Synthesis, ACM Transactions on Graphics, vol. 11, No. 4, Oct. 1992, pp. 305-335.

Westkund et al., Applying Appearance Standards to Light Reflection Models in the International Conference on Computer Graphics, 28th Conference, 2001, pp. 501-51, ISBN:1-58113-374-X.

Meyer et al., Computer Aided Design of Automotive Finishes, in the Proceedings of 10th Congress of the International Colour Association, Granada, Spain, pp. 685-688, 2005.

Meyer et al., A Computer Graphic System for Rendering Gonio-Apparent Colors, International Society for Optical Eng., Jun. 2002, pp. 922-925.

* cited by examiner

REALISTIC VIDEO COLOR DISPLAY

CROSS-REFERENCE TO RELATED APPLICATION

This application claims the benefit of U.S. Provisional Application Ser. No. 60/731,620 filed on Oct. 28, 2005 which is hereby incorporated by references in its entirety.

BACKGROUND OF THE INVENTION

This invention relates to a method of providing a realistic color display on a color display device, such as, a video monitor, of a gonioapparent color on an object, such as, an automobile body or part, like a fender or door panel that includes not only color but color travel, flake and surface texture.

Computer color selection methods are known in the art, as shown in Marchand et al. U.S. 2004/0093112 A1. An electronic display of automotive colors is shown in WO 2004/044850. Computer implemented methods for matching paint colors is also know, as shown in Rodrigues et al. U.S. 2005/0128484 A1. A method and system for visualizing paint on a computer generated object is shown in Kulczycka U.S. Pat. No. 6,717,584. However, there is a need for a computer implemented process wherein a color of a coating composition can be accurately shown which will effectively have the same appearance on an object, such as, an automobile fender or door having curved and irregular surfaces that will show not only color but color travel as light passes over the object, coating texture imparted by flake pigments, such as, aluminum flakes, coated flakes and the like, and surface texture. None of the aforementioned processes provide such parameters on a color display device, typically, a video screen display.

There is a need for a computer implemented process that will provide a realistic video image that incorporates the parameters listed above without use of trial and error of formulating coatings and applying the coatings to substrates to determine these parameters which is a time consuming and expensive process for formulating a desired paint color.

The novel process of this invention provides a computer implemented method for providing a realistic color of a paint coating on a color display device.

SUMMARY OF THE INVENTION

A computer-implemented method for displaying on a color display device a realistic color of a paint coating, said method comprising the following steps:

(A) identify L*, a* b* color values at least three different angles for a paint coating from a data base containing said values at the at least three angles or by measuring said color values of a paint coating at least three angles;

(B) convert the at least three angle L*, a* b* color values to tristimulus X, Y, Z values;

(C) develop a continuous function equation for each of the tristimulus X, Y, Z values vs. aspecular angle via computer implementation using solid color curve fitting or metallic color curve fitting techniques and calculate the range of angles to be displayed;

(D) calculate a range of aspecular angles required to display the object being rendered under the chosen orientation of object, light source and viewer;

(E) calculate R,G,B values from the tristimulus values over the range of aspecular angles and determine maximum R,G,B values, if the maximum R,G,B values are all less than the maximum R,G,B values allowed for the color display device being used to view color resulting from the R,G,B values proceed to step (F), if the R,G,B values are greater than or equal to the maximum R,G,B values allowed for the color display device being used return to step (B) and multiply the X, Y, Z values by a normalization coefficient of less than 1 and iterate steps (C), (D) and (E) to determine the maximum normalization coefficient that prevents the R,G,B values of the color to be equal to or exceed the allowable R,G,B values for the color display device being used;

(F) determine statistical texture function from a searchable data base or alternatively generate a texture function from instrumental measurements of the paint coating to be simulated; and (G) apply the statistical texture function to the R,G,B values of step (E) to modify said values and display color pixels on the color display device based on the modified R,G,B values to show the realistic color of the paint coating.

DETAILED DESCRIPTION OF THE INVENTION

Figure 1A:
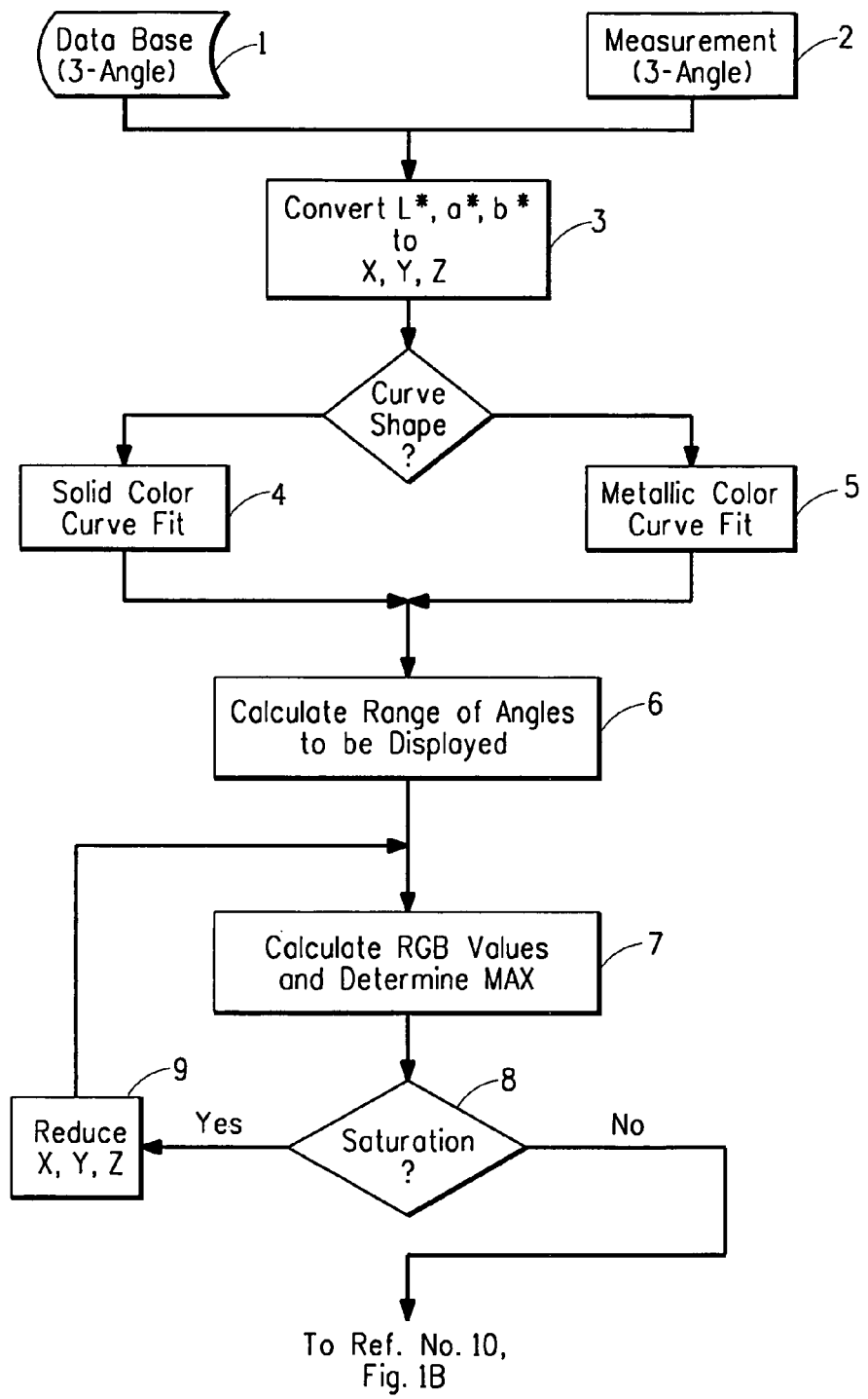
FIG. 1 shows an overall process flow chart of a computer implemented process to display on a monitor a realistic color of a coating composition.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

The computer implemented method of this invention is broadly directed to displaying a realistic color, particularly colors containing metallic flake pigments or special effects pigments, on a color display device of a wide variety of objects made of a variety of materials, such as metals, plastics, reinforced plastics, wood and other building materials and the like. Typical objects that can be displayed are, for example, vehicles, sports equipment, such as, baseball bats, snow mobiles, all types of architectural objects, such as, doors, building exteriors, room interiors and the like. The method also can be used to develop alternate colors, for paint color matching, color development, color styling and the like.

As used herein "vehicle" includes an automobile; truck; semitruck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A typical vehicle body or part thereof can be formed from a steel sheet, a plastic or a composite substrate and usually has along with flat surfaces curved and at times intricate surfaces. Curved surfaces having a coating, in particular, have a different appearance depending on viewing angle and the illumination angle. Pigment content of the coating, for example, metallic flake pigments, coated metallic flake pigments and other interference pigments provide the coating with unique color effects depending on concentration and type of pigment added. Texture and gloss of coatings viewed and illuminated from different angles, particularly on a curved surface, factor in significantly with the appearance of vehicle body or part.

This invention provides for a method that will display a realistic color on a color display device that will provide the viewer with a view of the resulting vehicle body or part that shows the user a realistic image of the part and the color. The method can also be used for color matching existing coatings on substrates for color styling of vehicles, to develop similar colors that can be used to match existing standard finishes on vehicles and to develop color standards that can be used in place of color chips that are currently being used as color standards.

The novel process of this invention is a computer implemented process using a conventional computer and computer programs and technology well know to those skilled in the art that provides a realistic color of a paint coating on a substrate that is displayed on a color display device, such as, a color video monitor.

Figure 1B:
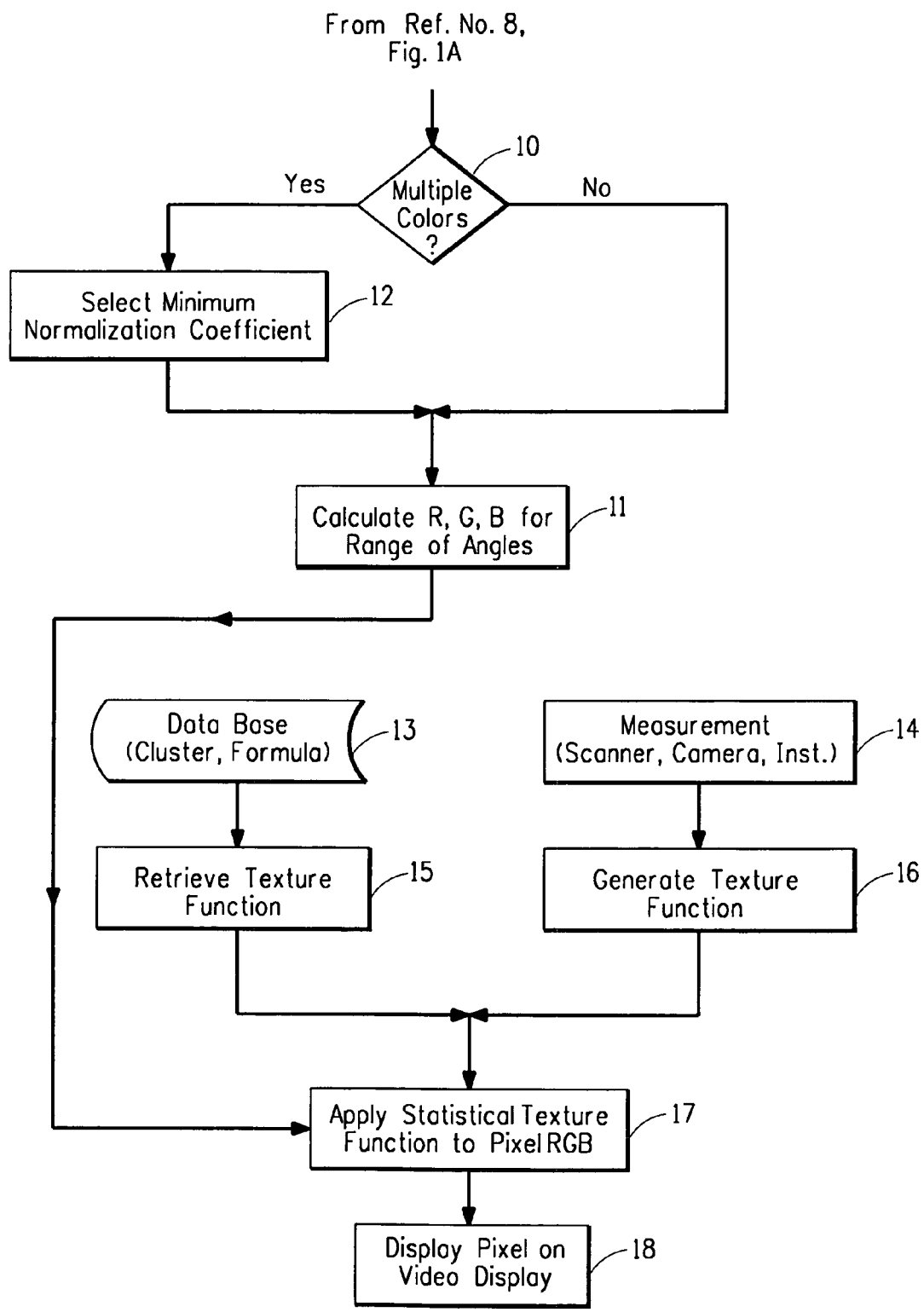

FIG. 1 shows a process flow chart of the computer implemented method for displaying on a color display device a realistic color of a paint coating.

In the first step (A) in the process, as set forth in the flow chart of FIG. 1, the L*, a*, b* color values of the color to be displayed are identified at three different angles. These values can be taken from a data base (1) wherein these color values have been determined for the color to be displayed, typically at three different angles or by actual measurements taken of the color, typically at three different angles (2). The angles that are typically used are aspecular angles of 15, 45 and 110 degrees. Other appropriate combinations of aspecular angles can also be used, such as, 15, 45 and 75 degrees and 25, 45 and 75 degrees.

It is generally well accepted that the three-dimensional color space can be used to define colors in terms of certain color characteristics or color attributes. CIELAB, also commonly referred to as L*a*b* or Lab, is a uniform device using independent color space in which colors are located within a three-dimensional rectangular coordinate system. The three dimensions are lightness (L), redness/greenness (a) and yellowness/blueness (b).

L*, a* b* color values are well known to those skilled in the art and represent coordinates in visual uniform color space and are related to X, Y and Z tristimulus values by the following equations which have been specified by the International Commission on Illumination:

L* defines the lightness axis $$L^* = 116\left[f\left(\frac{Y}{Y_0}\right) - \frac{16}{116}\right]$$

a* defines the red green axis $$a^* = 500\left[f\left(\frac{X}{X_0}\right) - f\left(\frac{Y}{Y_0}\right)\right]$$

b* defines the yellow blue axis $$b^* = 200\left[f\left(\frac{Y}{Y_0}\right) - f\left(\frac{Z}{Z_0}\right)\right]$$

where
$X_o$, $Y_o$ and $Z_o$ are the tristimulus values of the perfect white for a given illuminant;
and where $f(Y/Y_0) = (Y/Y_0)^{1/3}$ for $Y/Y_0$ greater than 0.008856 and $f(Y/Y_0) = 7.787(Y/Y_0) + 16/116$ for $Y/Y_0$ less than or equal to 0.008856; $f(X/X_0)$ and $f(Z/Z_0)$ are similarly defined.

In step (B) of the process using the above equations, the L* a* b* values for each of the angles utilized are converted into tristimulus X, Y, and Z values (3) as outlined in the following section of computer pseudo-code.

```
If L* < 7.99962
    Then YYN = L*/903.3
    Else YYN = ((L* + 16)/116)³
End If
Y = YYN × Y_o
If YYN > 0.008856
    Then FYYN = YYN^(1/3)
    Else FYYN = 7.787 × YYN + 0.13793
End If
FXXN = a* / 500 + FYYN
If FXXN > 0.206893
    Then XXN = FXXN³
    Else XXN = (FXXN - 0.13793) / 7.787
End If
X = XXN * X_0
FZZN = FYYN - b*/200
If FZZN > 0.206893
    Then ZZN = FZZN³
    Else ZZN = (FZZN - 0.13793) / 7.787
End IF
Z = ZZN * Z_0
where
    X_o, Y_o and Z_o are the above described tristimulus values;
``` and where

YYN, FYYN, XXN, FXXN, ZZN, FZZN are intermediate variables used only during the calculation The above equations are shown in ASTM Standard E 308, which is hereby incorporated by reference.

Via computer implementation, a continuous function equation for each of the tristimulus X, Y and Z values versus each aspecular angle are developed in step (C). The computer uses, where appropriate, one or more of the following curve fitting techniques: solid color curve fitting (4) or metallic color curve fitting (5).

For solid colors, i.e., colors containing no flake, pearl or other special effect pigments, the same value for X, Y, and Z are applied regardless of aspecular angle.

For most effect finishes, the three angle X, Y, Z data from above are fit to a function of the type:

$$F_\alpha = A^* \exp^{(-\alpha/B)} + C$$

Where $F_\alpha$ is the tristimulus value if interest, i.e., X, Y, Z at aspecular angle $\alpha$, and A, B, C are coefficients of the curve fit; or of the type:

$$F_\alpha = A + B\alpha + C\alpha^2 + D\alpha^3 + E\alpha^4$$

Where $F_\alpha$ is the tristimulus value of interest, i.e., X, Y, Z at aspecular angle $\alpha$, and A, B, C, D and E are coefficients of the curve fit. In order to use this $4^{th}$ order polynomial fit, it is necessary to generate two synthetic data points. This is accomplished by taking the X, Y, Z tristimulus data for the 15°, and 45° aspecular angles and assigning them to aspecular angles of 205° and 175° respectively. This provides the minimum of five data points required for a $4^{th}$ degree polynomial fit and the data symmetry around the 110° point assures that the resultant fit will have a slope of zero at the limiting angle of 110°.

In step (D), the range of aspecular angles is calculated to display the object being viewed under chosen orientation of the object, light source and viewer (6). To accomplish this, the surface normal is calculated for each pixel on the object to be rendered. Using this surface normal and knowing the angle of the illumination vector to this pixel, the specular vector ray associated with each pixel can be calculated. The aspecular angle for this pixel is then determined by calculating the angle between the specular vector ray and the viewing vector.

In step (E), the R, G, B values (red, green, blue values) are calculated from the tristimulus values over the range of aspecular angles calculated above (7).

The derivation of R, G, B values from tristimulus data X, Y, and Z is made from known mathematical calculations, based upon color characteristics. The following are examples of typical coefficients that can be used which are dependent on the monitor being used and illumination conditions. Those skilled in the art know how to use monitor calibration information provided by the manufacturer of the monitor or generic calibration information that is readily available.

A typical conversion from X, Y, and Z tristimulus data to R,G,B values takes the form of a simple matrix transformation shown as follows:

$$\begin{bmatrix} R \\ G \\ B \end{bmatrix} = \begin{bmatrix} 3.24079 & -1.537150 & -0.498535 \\ -0.969256 & 1.875992 & 0.041556 \\ 0.055648 & -0.204043 & 1.057311 \end{bmatrix} * \begin{bmatrix} X \\ Y \\ Z \end{bmatrix}$$

The inverse transform simply uses the following inverse matrix:

Over the range of aspecular angles the maximum saturation of R, $$\begin{bmatrix} X \\ Y \\ Z \end{bmatrix} = \begin{bmatrix} 3.24079 & -1.537150 & -0.498535 \\ -0.969256 & 1.875992 & 0.041556 \\ 0.055648 & -0.204043 & 1.057311 \end{bmatrix}^{-1} * \begin{bmatrix} R \\ G \\ B \end{bmatrix}$$

G, B values is determined (8). If the maximum R, G, B values are all less than the maximum saturation of the R, G, B values allowed for the color display device, usually a color video monitor, being used to view the color resulting from the R, G, B values then proceed to step (F) of the process.

If the R, G, B values are greater than or equal to the maximum saturation of the R, G, B values allowed for the color display device being used return to step (B) and multiply the X, Y, Z values by a normalization coefficient of less than 1 and iterate steps (C), (D) and (E) to determine the maximum normalization coefficient that prevents the R,G,B values of the color to be equal to exceed the allowable R,G,B value for the color display device being used (9). If a single color is being developed, the R, G, B values for the range of angles is, calculated (11).

If multiple similar colors are to be generated (10), for example, if three similar color alternates are to be generated and displayed for use in matching a current vehicle color or a color standard or for purposes of styling, steps (A)-(E) are repeated for each color. A normalization coefficient is determined for each color as described above and the minimum normalization coefficient is selected (12) so that R, G, B values of the display device being used are not exceeded thereby making it possible to properly compared each of the colors to one another.

In step (F), a statistical texture function of the color is then determined by retrieval from a database, calculation from the paint formula or by instrumental means. The texture of a color is the result of the presence of flakes in the resulting composition, such as, metallic flakes like aluminum flakes, coated aluminum flakes, interference pigments, like mica flake coated with metal oxide pigments, such as, titanium dioxide coated mica flake or iron oxide coated mica flake, diffractive flakes, such as, vapor deposited coating of a dielectric over finely grooved aluminum flakes.

The statistical texture function can be determined from a database (13). Useful databases include color and texture information that are searchable, for example by paint code, manufacturing plant code, and date of manufacture which are typically available for vehicles. On identification of the paint color used on the vehicle, texture information is retrieved from the database and a statistical texture function is generated (15). The database (13) can be based on color clustering techniques and procedures. Color clustering techniques and procedures are disclosed in U.S. Ser. No. 11/418,433 filed May 4, 2006, which is hereby incorporated by reference. A similar clustering process can be used to obtain a data base for color texturing.

Alternatively, the statistical texture function can be generated (16) from instrumental measurements of the paint coating to be simulated (14). The statistical texture function can be generated by measuring the pixel intensity distribution of an image of the paint coating to be simulated which was captured by an electronic image capture device and then duplicating those pixel intensity statistics in the rendered image. For example, if the pixel intensity distribution of the captured image is Gaussian in nature and has mean intensity of $\mu$ and a standard deviation of $\sigma$, then the rendered image can be statistically modified to reflect the same relative statistics. The nature of the statistical fit is dependent on the specific coating being simulated. The following instruments can be used to generate useful data for the determination of the statistical texture function: flatbed scanning device, wand type scanner or an electronic camera.

In step (G) of the novel process, the statistical texture function determined in step (F) is applied to the R, G, B values determined in step (E) to modify the R, G, B values (17) to reflect the same pixel intensity distribution as measured by the electronic image capture device. Color pixel are modified according to these values and are displayed on a color display device (18), typically, a video monitor, to show a realistic color on the display device.

A viewer of the resulting color can expect that the color will be suitably representative to that of an actual paint coating applied to a vehicle body or part thereof.

The computer implemented method of this invention is useful for a variety of procedures. Realistic video color standards can be developed and used in the place of manufactured color chips which are expensive to make and difficult to duplicate. The novel method is useful for determining the blendability of paint colors to obtain a match to an existing color and can be used to determine when color shading of paint is sufficiently close so that on application an acceptable color match will be obtained to an existing color which frequently is a problem faced in refinishing of vehicles. Blending simulation can be accomplished by calculating the R, G, B values required to render the two colors to be blended. The blend is simulated by interpolating the intermediate XYZ values across the object being rendered to transition (blend) from one color to the next. This interpolation may be linear in nature, or non-linear to simulate various blend scenarios. Reference colors can readily be developed without physical mixing and application of paints to substrates. Realistic color styling of a vehicle can be done with the novel method with a very high level of assurance that the resulting painted vehicle will have the appearance shown on the video monitor. Alternate selections of similar paint colors can readily be compared that are particularly useful in refinishing of vehicles.

The novel method of this invention can be readily adapted to view an object coated with a particular paint from a variety of different viewing angles and illumination angles making it possible, for example, to view an automobile or truck from various angles under various illumination angles. This is very useful since coatings containing, for example, interference pigments, can have a significantly different appearance depending on the viewing angle and the illumination angle and curvature of the surface of a vehicle.

What is claimed is:

1. A computer-implemented method for displaying on a color display device a realistic color of a paint coating, said method comprising the following steps:
   (A) identifying L*, a* b* color values at least three different angles for a paint coating from a data base containing said values at the at least three angles or by measuring said color values of a paint coating at least three angles;
   (B) converting the at least three angle L*, a* b* color values to tristimulus X, Y, Z values;
   (C) developing a continuous function equation for each of the tristimulus X, Y, Z values vs. aspecular angle via computer implementation using solid color curve fitting or metallic color curve fitting techniques and calculating the range of angles to be displayed;
   (D) calculating a range of aspecular angles required to display an object being rendered under the chosen orientation of object, light source and viewer;
   (E) calculating R,G,B values from the tristimulus values over the range of aspecular angles and determining maximum saturation of R,G,B values and in the event the maximum R,G,B values are all less than the maximum R,G,B values allowed for the color display device being used to view color resulting from the R,G,B values proceed to step (F), in the event the R,G,B values are greater than or equal to the maximum R,G,B values allowed for the color display device being used return to step (B) and multiply the X, Y, Z values by a normalization coefficient of less than 1 and iterate steps (C), (D) and (E) to determine the maximum normalization coefficient that prevents the R,G,B values of the color to be equal to or exceed the allowable R,G,B values for the color display device being used;
   (F) determining statistical texture function from a searchable data base, or generate a texture function from instrumental measurements of the paint coating to be simulated; and
   (G) applying the statistical texture function to the R,G,B values of step (E) to modify said values and display color pixels on the color display device based on the modified R,G,B values to show the realistic color of the paint coating.

2. The computer implemented process of claim 1 wherein the color display device is a color video monitor.

3. The computer implemented process of claim 2 wherein multiple similar colors are generated and where the same factor, to prevent the R,G,B values from equaling or exceeding the maximum R,G,B values for the display device being used is applied to all of the similar colors so that they can be properly compared one to another.

4. The computer implemented process of claim 2 wherein three angles are used in step (1) and subsequent steps.

5. The computer implemented process of claim 3 adapted with the use of algorithms to simulate the blending of at least two colored coating compositions to form a coating color having the desired R,G,B values to determine if the two colored coating composition are blendable to prepare a desired color of the resulting coating composition.

6. The computer implemented process of claim 1 wherein the resulting realistic color of the paint is a color standard for a color coating comparison.

7. The computer implemented process of claim 3 wherein the resulting realistic color of the paint is used to select between alternate suggested paint formulas to match a standard paint color.

8. The computer implemented process of claim 3 wherein the resulting realistic color of the paint is used to monitor the computer shading of a paint formula to better match a color standard and when to stop shading of the paint.

9. The computer implemented process of claim 4 where the three angles used are aspecular angles of 15, 45 and 110 degrees.

10. The computer implemented process of claim 1 where texture function is determined from data gathered by a flatbed scanning device.

11. The computer implemented process of claim 1 where texture function is determined from data gathered by a wand type scanner.

12. The computer implemented process of claim 1 where texture function is determined from data gathered by an electronic camera.

13. The computer implemented process of claim 1 where texture function is determined from data gathered by an instrument specifically designed to determine texture information.

14. The computer implemented process of claim 1 where intensity of specular highlights is artificially reduced by limiting the range of specular angles.

15. The computer implemented process of claim 1 whereby color blending of a paint coating utilizing at least two colors is simulated by interpolating across an object being rendered from X, Y, Z values for one color of the blend to the X, Y, Z values for the second color of the blend.

16. The computer implemented process of claim 15 where the X, Y, Z interpolation from one color to the other is linear.

17. The computer implemented process of claim 15 where the X, Y, Z interpolation from one color to the other is non-linear.

18. The computer implemented process of claim 1 whereby the realistic color of the paint coating is utilized in styling of vehicles.

19. A system for displaying on a color display device a realistic color of a paint coating, said system comprising
   (1) a computing device;
   (2) a computer readable program which causes an operator and the computing devise to perform the following:
   (A) identifying $L^*$, $a^*$ $b^*$ color values at least three different angles for a paint coating from a data base containing said values at the at least three angles or by measuring said color values of a paint coating at least three angles;
   (B) converting the at least three angle $L^*$, $a^*$ $b^*$ color values to tristimulus X, Y, Z values;
   (C) developing a continuous function equation for each of the tristimulus X, Y, Z values vs. aspecular angle via computer implementation using solid color curve fitting or metallic color curve fitting techniques and calculating the range of angles to be displayed;
   (D) calculating a range of aspecular angles required to display the object being rendered under the chosen orientation of object, light source and viewer;
   (E) calculating R,G,B values from the tristimulus values over the range of aspecular angles and determining maximum saturation of R,G,B values and in the event the maximum R,G,B values are all less than the maximum R,G,B values allowed for the color display device being used to view color resulting from the R,G,B values proceed to step (F), in the event the R,G,B values are greater than or equal to the maximum R,G,B values allowed for the color display device being used return to step (B) and multiply the X, Y, Z values by a normalization coefficient of less than 1 and iterate steps (C), (D) and (E) to determine the maximum normalization coefficient that prevents the R,G,B values of the color to be equal to or exceed the allowable R,G,B values for the color display device being used;
   (F) determining statistical texture function from a searchable data base, or generate a texture function from instrumental measurements of the paint coating to be simulated; and
   (G) applying the statistical texture function to the R,G,B values of step (E) to modify said values and display color pixels on the color display device based on the modified R,G,B values to show the realistic color of the paint coating.

20. The system of claim 19 wherein the color display device is a color video monitor.

* * * * *